May 15, 1945.  G. GAITHER  2,376,045
PROCESS FOR THE PURIFICATION OF AMMONIUM SULPHATE
Filed Aug. 20, 1942
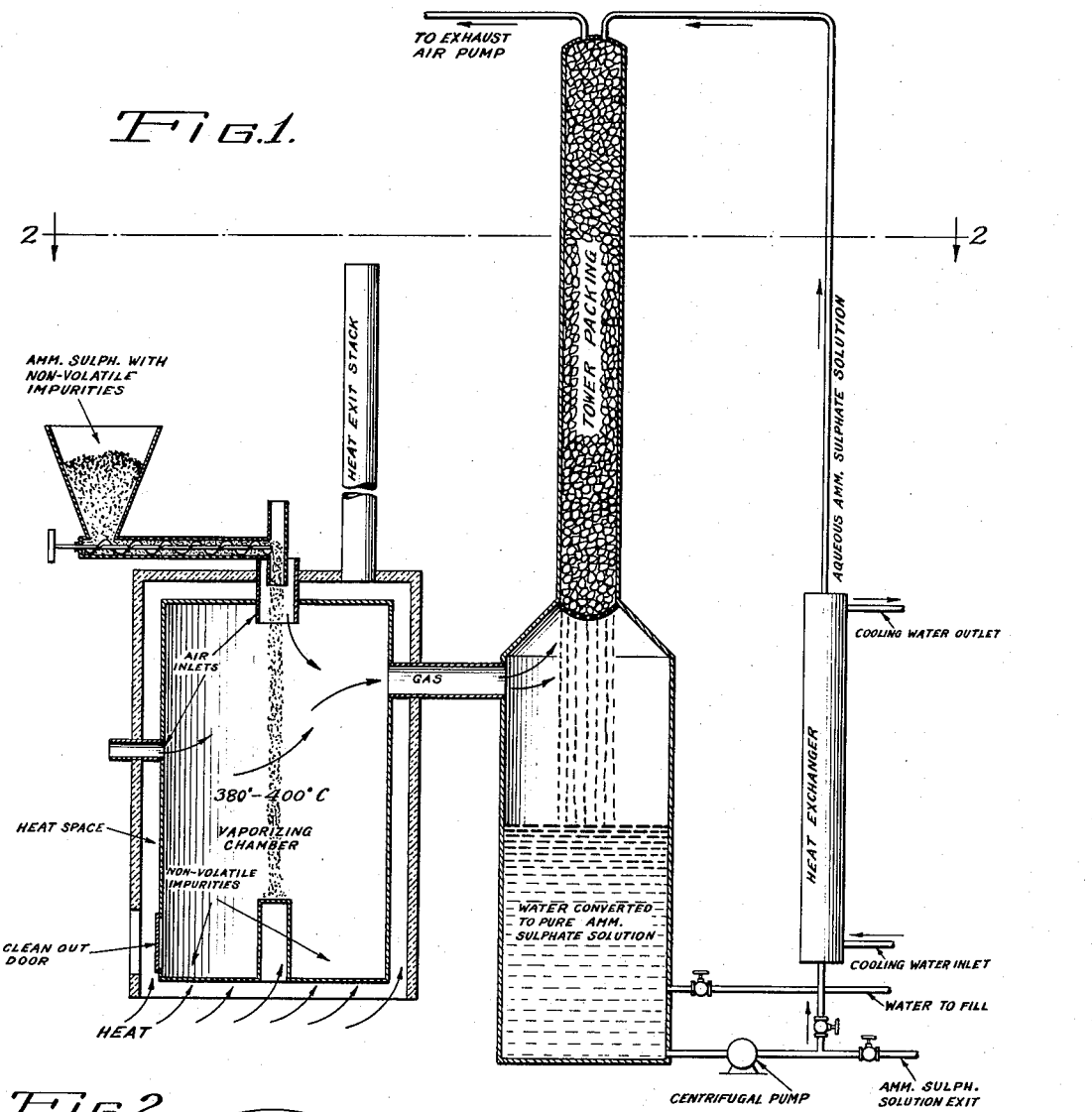
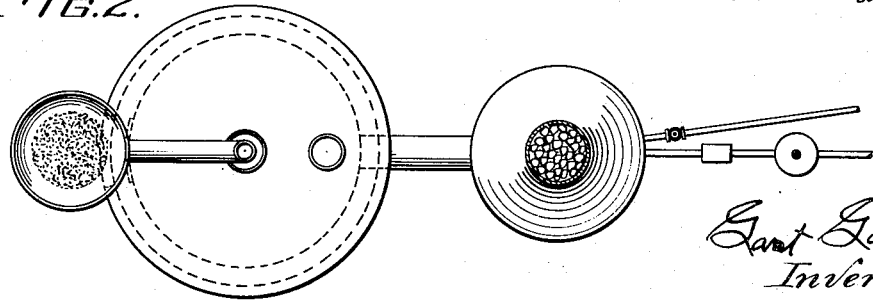
Gant Gaither
Inventor:

Patented May 15, 1945

2,376,045

UNITED STATES PATENT OFFICE 2,376,045

PROCESS FOR THE PURIFICATION OF
AMMONIUM SULPHATE

Gant Gaither, Hopkinsville, Ky.

Application August 20, 1942, Serial No. 455,441

1 Claim. (Cl. 23—120)

I have discovered a new and useful method not previously disclosed by anyone whereby this purification may be accurately and completely accomplished with a very moderate expense and this will make the process, which has heretofore been uneconomical and that could not be used commercially, now satisfactory on these points. In order that this purification may be seen in its relation to the entire process for which it is specifically invented, although it has many other fields of usefulness, I will detail an outline of treatment of aluminous clays by this process. Normal ammonium sulphate is heated until one molecule of ammonia is expelled and acid ammonium sulphate is left. This molecule of ammonia is caught as an hydroxide and used later to precipitate alumina, the acid sulphate thus formed is then applied to the ground clay with the constant result that double alums are formed. These are dissolved and the silicious residue discarded. This ammonia alum is crystallized out and washed and we find it crystallized out nicely ahead of the other alums from which it separates. These alum crystals are then treated with the ammonia above referred to forming pure alumina and normal ammonium sulphate solution. The alumina is filtered off, calcined and used in making metallic aluminum. The normal ammonium sulphate is dried and acid sulphate again reformed and mixed with the mother liquor which solution is then used to treat more clay. When iron and other basic elements have attained sufficient concentration to become burdensome to the process they must be removed.

In Patent No. 1,493,320 above referred to, by Buchner, on page 2, line 71, he says:

"But it is necessary, if it contains too much iron, that it be deprived of this and any other undesired impurities by precipitating them with ammonia."

Unfortunately, the basic contaminations from clay, such as potassium, calcium, magnesium, sodium and other members of these families, are not precipitated by ammonia and cannot thus be removed. The process which I have devised to accomplish this is the use of the fact that when ammonium sulphate, with the contaminating basic elements, as sodium, calcium, magnesium, strontium sulphate and other sulphates of these families, and all of which are unprecipitated by ammonia, is heated to a temperature of 380–400 degrees centigrade, ammonium sulphate volatilizes and will leave these undesired impurities non-volatilized at this temperature in the sublimating chamber. I have further found that it is necessary that this ammonium sulphate and these contaminations be not heated in a container where the entire mass is heated at one time with chemical reactions taking place from the bottom of the mass to the top as volatilization happens, because undesired reduction of the sulphates to sulphites will occur in considerable amounts. My invention completely obviates this occurrence by the use of a combustion chamber heated to 380–400 degrees centigrade with the introduction of ammonium sulphate and basic contaminations slowly in dry state, preferably by a screw conveyor at the top of the chamber, so that the volatilization occurs in mid-air. The gases pass into an absorption tower to reform in solution, normal pure ammonium sulphate. For an accurate description of this process I refer you to the attached diagram.

This invention relates to a process for the purification of ammonium sulphate with special reference to basic contamination accumulated when the sulphate is used in a cyclic process in the form of ammonium bisulphate, but unprecipitated by the addition of ammonia when it is returned to its normal sulphate form.

In any chemical process in which the reagent is used cyclically one of the obstacles to perfect results and to economic value is the accumulation of basic impurities which are not precipitated when the cycle of the process has been entirely completed. This accumulation is built up gradually and surely until it becomes a constant in the process too heavy for economic use of the reagent, therefore the reagent must be periodically purified in order that the original process may be commercially feasible.

Among such processes is the application of ammonium sulphate to the treatment of aluminous materials such as clays for the extraction of metallurgical alumina and particularly a process developed by Max Buchner of Hanover, Germany, and patented in America on May 6, 1924, under Patent Number 1,493,320. This process is quite efficient but uneconomical because no adequate provisions are made for the purification of basic contaminations, such as potassium, sodium, magnesium, calcium and members of these families.

This shows in Figure 1 a cross-section of and the apparatus used in the invention in which a hopper contains ammonium sulphate with non-volatile impurities above described. Beneath it is a screw conveyor which carries the dry ingredients to the top of the combustion chamber which is insulated and heated from below with lateral spaces and heat exit stack to guarantee uniform heating of the entire chamber. Leading into the combustion chamber are small air inlets in order that there may be no vacuum and by means of an exhaust air pump, to carry the ammonia and other gases out of the combustion hamber while the non-volatile contaminants fall to the bottom of the chamber to be removed later through a properly placed clean-out door of said chamber. Next in the diagram, Figure 1, is the absorption tower, on the right, packed with coke or other tower packing material, in which is circulated by means of a pump, sufficient water to capture all the gases and reform normal ammonium sulphate absolutely clear of the undesired impurities described. In addition there is let into the water circulating system a cooling coil which maintains proper temperature of the water solution. When the process is completed the water tank will contain a solution of normal sulphate and the bottom of the combustion chamber will contain the basic contamination. Figure 2 of the diagram is a plain view of the apparatus.

What I claim is:

A process for recovering pure ammonium sulphate from ammonium sulphate contaminated with at least one of the group consisting of alkali metal and alkali earth metal salts, which comprises feeding the finely divided contaminated ammonium sulphate into a heated zone at the top thereof, heating the sulfate while it is falling through air in said zone to a temperature of approximately 380° to 400° C. so as to volatilize the ammonium sulphate without volatilizing the contaminating compound and absorbing the vapors from the ammonium sulphate in an aqueous solution to recover purified ammonium sulphate.

GANT GAITHER.